March 20, 1945. A. BENZ 2,371,602
SPRING MOUNTED LOGGING BUNK
Filed Sept. 29, 1941 2 Sheets-Sheet 1
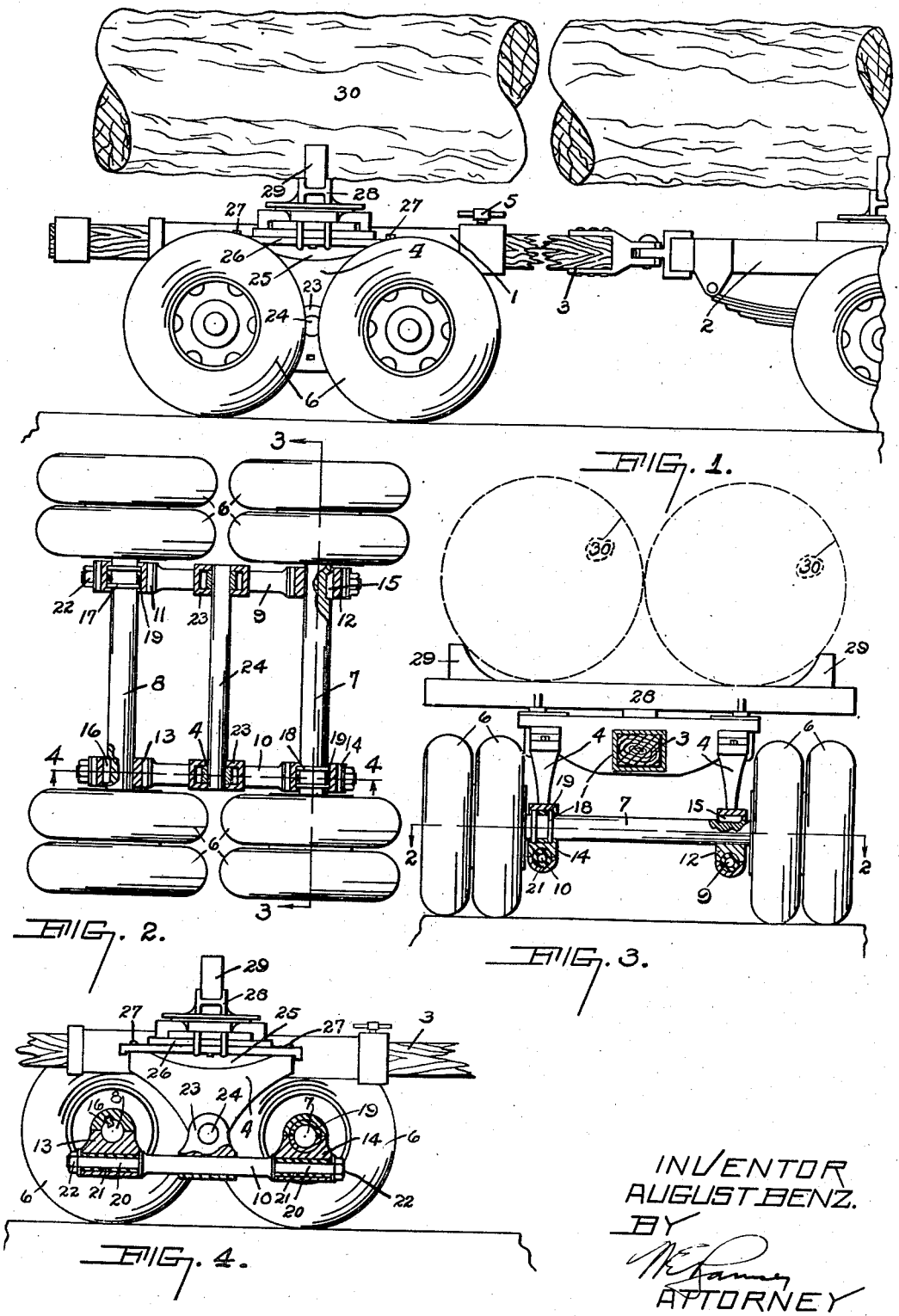
INVENTOR
AUGUST BENZ.
BY
ATTORNEY

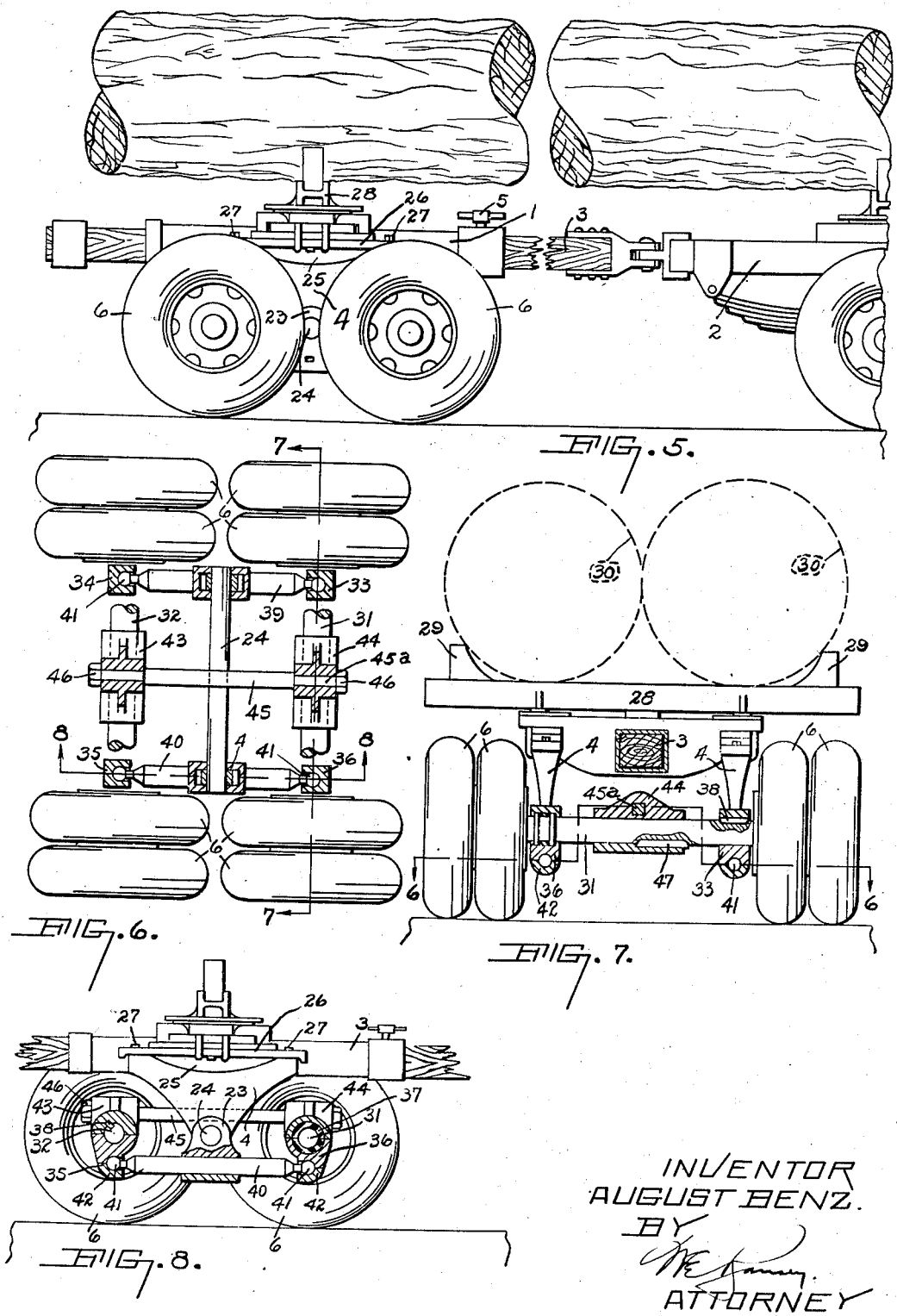

Patented Mar. 20, 1945

2,371,602

UNITED STATES PATENT OFFICE 2,371,602

SPRING MOUNTED LOGGING BUNK

August Benz, Portland, Oreg., assignor to Benz Spring Co., Portland, Oreg., a corporation of Oregon Application September 29, 1941, Serial No. 412,876

8 Claims. (Cl. 280—124)

My invention relates to wheel mounted vehicles and has particularly to do with logging trailers and similar devices adapted to support heavy loads over relatively rough surfaces and under high speeds. Devices of this character preferably are provided with plural axles and said axles must be mounted to permit relative articulation with respect to the frame side of the trailer so as to accommodate rough road surfaces. There cannot be any substantial amount of play therein because the combination of heavy loads, rough road surfaces, and speed quickly cause moving parts to become worn and the wheels to become out of alinement with consequent damage to the running gear and undue wear to the tires. At the present time, it is common practice to support the bolster of a vehicle of this character upon frames which in turn are carried by the axles of the vehicle. The springs not only tend to absorb the jarring effect of the vehicle on rough road surfaces, but also provide some limited articulation to permit relative axial movement of the axles with respect to each other. They are disadvantageous, however, because of said inherent flexibility and elasticity, they permit the axles to come out of alinement with each other and if vehicles of this character are loaded unevenly as far as the longitudinal center line is concerned, it permits the springs on one side to flatten and to permit the axles to come out of transverse alinement unless said axles are tied together and in that case, a rigid connection tends to limit the articulation of said parts.

I have determined that a load can be supported upon a vehicle of this character by tying the axles of a dual axle vehicle together by longitudinally extending tie rods supporting the frame sides of said vehicle directly upon said tie rods without intermediate spring elements. Spring support of the load can be provided by placing springs between the load supporting member, which in a log trailer is a bunk, and the frame sides. The springs when mounted in this manner do not affect the alinement of the axles and tie rods and the alinement of the wheels one with the other and do not affect the articulation of said members, yet resiliently support the load.

A further feature of my invention is to so arrange the running gear, that is the axles and tie rods, the frame sides and the associated mechanisms, that limited articulation can be accommodated without providing journal bearings except where the frame sides join the tie rods. This minimizes wear at said points, and other consequential injury which results from two pieces rubbing together. I accomplish this result by securing the tie rods to the axles thru resilient members, such, for example, as rubber sleeves or rubber pads which have an inherent quality of permitting limited articulation without causing the parts to slide one on the other. I provide the maintenance of alinement between the two axles and the wheels carried thereby and yet accommodate limited articulation by providing one or more longitudinally extending torsion rods joining the axles together. Said torsion rods may be the longitudinal tie rods themselves or may be a separate centrally located rod, in which case the tie rods may be arranged to have relatively free but limited articulation, the limiting factor as far as articulation is concerned being introduced and maintained by the central torsion rod.

Further and more specific features of my invention and the details of operation thereof are hereinafter described with reference to the accompanying drawings, in which:

Fig. 1 is an elevation of a log hauling trailer embodying my invention, shown secured to the rear end of a hauling truck, logs being shown supported on the bunk of said trailer by springs lying intermediate the bunk and the frame sides of said trailer;

Fig. 2 is a horizontal section thru the running gear of said trailer, taken substantially on the line 2—2 in Fig. 3, showing the manner in which the axles are secured together and the pivotal connection between the bolster and said running gear;

Fig. 3 is a vertical section taken substantially on the line 3—3 in Fig. 2, illustrating how logs are supported on the bunk and how limited articulation may be had between the axles and the tie rods;

Fig. 4 is a longitudinal section taken on the line 4—4 in Fig. 2, showing the manner in which one tie rod is secured to the frame sides and to the axle boxes carried by the dual axles, respectively;

Fig. 5 is an elevation of a modified form of my invention embodied in a log hauling trailer;

Fig. 6 is a horizontal section taken on the line 6—6 in Fig. 7;

Fig. 7 is a transverse section taken on the line 7—7 in Fig. 6, parts being shown broken away, however, to disclose details of construction; and Fig. 8 is a longitudinal section taken on the line 8—8 in Fig. 6, illustrating how the axles are tied together by tie rods permitting articulation, which articulation is limited, however, by a centrally arranged torsion rod.

Referring first to the embodiment of my invention as is illustrated in Figs. 1 to 4, inclusive: A log hauling trailer 1 is secured to a truck 2 by a so-called reach 3 which is adjustably secured to frame sides 4 of the trailer by means of one or more clamping screws 5. The reach extends between the frame sides and thus general alinement of the truck and trailer is maintained. The trailer is supported by rotatable wheels 6 carried by the ends of forward axle 7 and rearward axle 8. Dual tires are illustrated because this is the common practice in supporting such heavy loads. The axles are connected by tie rods 9 and 10 which engage the axles adjacent the ends thereof but inwardly of the wheels 6. Fittings or axle boxes 11, 12, 13 and 14 are provided on the four points of engagement between the tie rods at each side and the forward and rearward axles. It is desirable that each axle have one tie rod rigidly secured thereto and thus the left hand tie rod or upper tie rod, as shown in Fig. 2, is secured to the axle in fitting 12 by a keyed connection 15. The rearward end of tie rod 10 is likewise secured to the right hand end of rearward axle 8 by a similar keyed connection 16. That is, said keyed connections are diagonally opposite each other when considering the fittings or axle boxes and the points of connection between the tie rods and the axle.

Axle box 11 and axle box 14 are secured to the axles by clamping connections 17 and 18 and included in each clamping connection is a rubber sleeve 19. Thus, the clamping connections 17 and 18 permit limited articulation between the tie rod and the axle which said clamping connections engage. This is limited by the thickness and resilience of said rubber sleeve. I have found, however, that there is sufficient inherent resiliency in sleeves of one-half inch to one inch thickness to accommodate articulation at these points. It is to be understood, however, that the clamping connections are fitted tightly so that there is no relative rotation at this point and articulation is permitted only by reason of the resiliency of the sleeve. The tie rods 9 and 10 are secured to the fittings or axle boxes by having a reduced portion 20 at each of the ends of said tie rods which extend thru said fittings and are surrounded by rubber sleeves or pads 21. Said sleeves or pads may be vulcanized to the fittings or axle boxes and said reduced portion of the tie rod so that there is a firm bond between said parts or said sleeves or pads may be locked between said parts by causing nuts 22 at the ends of said tie rods to be set down tight to crowd said sleeves or pads into the bores of the fittings or axle boxes in the manner shown in Fig. 4. That is, the said sleeves or pads normally are substantially longer than the bore of the fittings or axle boxes and said sleeves or pads fit relatively snugly within said bores. The sleeves or pads are then upset by drawing down the nuts at each end of the tie rod to compress the rubber sleeves or pads into smaller compass and thus to bind said tie rods and said fittings or axle boxes so tightly together that there can be no movement between the sleeve and the tie rod and the sleeve and the fitting or axle box. I preferably make the tie rods elongated and of spring steel so that said tie rods have some flexibility and accommodate torsion. Thus they accommodate up and down movement of the axles and axial movement thereof, which axial movement is desirable to permit said wheels to pass successively over a bump or a depression in the road surface.

A pair of stirrups 23 are firmly secured to the tie rods intermediate the ends of the latter. This is accomplished by keying, welding or by a shrink fit so that the stirrups and the tie rods to which they are secured function as integral members. Said stirrups are secured to bolster 4 by a transverse shaft 24. Said stirrups are permitted pivotal action on said shaft and thus the running gear comprising the wheels, axles, tie rods, and stirrups may rock about the axis of transverse shaft 24.

The upper portions of two spaced frame sides 4 are provided with recessed top 25 and bridging said top are a pair of laminated spring members 26 at each end of the bolster. Said spring members are secured to the ends of said recessed top by bolts 27 and at the middle of said spring members a bunk 28 is clamped thereto lying across said spring members and being resiliently supported thereby. Said bunk extends substantially the entire width of the trailer and carries the usual chocks 29 to prevent logs 30 from rolling laterally.

It is thus apparent that the axles are resiliently supported by the pneumatic wheels which I have found to be sufficient to absorb road shock on said members and the frame sides and stirrups are resiliently supported by the flexibility of the tie rods 9 and 10. The load which constitutes the major portion of the weight of a loaded trailer is supported, in addition, by the spring members 26 underlying the bunk 28. The shifting of spring members from between the axles and frame sides to a point between the frame sides and the bunk permits the parts to be lowered in overall height and in addition produces the new results previously commented upon and eliminates the inherent faults resulting from the placing of said springs in the common position.

In referring now to the modification illustrated in Figs. 5 to 8, inclusive, similar reference figures will be given to corresponding parts of this modification as are given to those illustrated and described with respect to the previous embodiment.

The modification illustrated in Figs. 5 to 8, inclusive, is directed to the attainment of the same results which may be achieved but the parts are modified slightly in accomplishing this result. Axles 31 and 32 carry wheels 6 at their outer ends and are provided with axle boxes 33, 34, 35, and 36, one at each end of the two axles. Diagonally disposed axle boxes are provided with rubber sleeves 37 and the other axle boxes are provided with keyed connections 38 to permit articulation but to maintain alinement of said parts. Tie rods 39 and 40 are provided with ball-like ends 41 and the axle boxes are provided with sockets 42 thus to permit universal articulation between said ball-like ends and said sockets. That is, the tie rods and the axle boxes are permitted universal articulation.

In this modification, however, I provide fittings 43 and 44 at the middles of the axles and rigidly secure said fittings one with the other by a longitudinally extending torsion bar 45. Said torsion bar preferably is of non-circular section, as is illustrated in Fig. 7, so as to prevent the axles from moving out of axial alinement one with the other, except within restricted limits defined by the twisting of said torsion bar under operating stresses. Said torsion bar is held in place in fittings 43 and 44 by nuts 46 arranged at the ends thereof. Said nuts hold the non-circular portions 45a of said torsion bar tightly in the correspondingly shaped recesses in fittings 43 and 44 so as to prevent play from developing at this point. It is to be noted that the torsion bar is arranged centrally of the trailer and is spaced substantially above the transverse shaft 24. Said torsion bar not only is flexible to permit twisting about the longitudinal axis thereof but also is adapted to spring longitudinally and thus some factor of spring support is provided by said torsion bar. Fittings 43 and 44 are keyed to the axles upon which they are mounted each by a key 47 so as to prevent relative rotation of said fittings with the axles upon which they are carried.

I claim:

1. A wheel mounted vehicle comprising frame sides, a pair of spaced axles, said frame sides being pivotally mounted intermediate said axles and being supported thereby, means tying said axles together and permitting limited relative movement with respect to each other, said means including a longitudinal torsion bar extending between said axles.

2. A wheel mounted vehicle comprising frame sides, a pair of spaced axles, said frame sides being pivotally mounted intermediate said axles and being supported thereby, means tying said axles together and permitting limited relative movement with respect to each other, said means including fittings gripping each of said axles, and a longitudinal torsion bar extending between said axles, being secured thereto thru said fittings.

3. A wheel mounted vehicle comprising frame sides, a pair of spaced axles, said frame sides being pivotally mounted intermediate said axles and being supported thereby, means tying said axles together and permitting limited relative movement with respect to each other, said means including fittings gripping each of said axles, a longitudinal torsion bar extending between said axles, being secured thereto thru said fittings, and two diagonally disposed fittings only including resilient pads permitting limited rotation of said axles in said fittings.

4. A wheel mounted vehicle comprising frame sides, a pair of spaced axles, a pair of longitudinal tie rods extending between said axles in a relatively non-resilient fashion and being secured at their ends to said axles, respectively, said frame sides being pivotally secured to said tie rods intermediate the ends of the latter, a transversely arranged bunk, and longitudinally extending spring members mounted on each of said frame sides, being secured at their ends to said frame sides, and being secured intermediate said ends to said bunk, resiliently supporting said bunk on frame sides.

5. A wheel mounted vehicle comprising frame sides, a pair of spaced axles, a pair of longitudinal tie rods extending between said axles and being secured at their ends to said axles, respectively, said frame sides being pivotally secured to said tie rods intermediate the ends of the latter, a transversely arranged bunk, longitudinally extending laminated spring members mounted on each of said frame sides, being secured to their ends to said frame sides, and being secured intermediate said ends to said bunk, resiliently supporting said bunk on the frame sides.

6. A wheel mounted vehicle comprising, a pair of spaced axles, axle boxes carried adjacent the ends of said axles, a pair of longitudinal tie rods secured at their ends, respectively, to said axle boxes, and frame sides pivotally secured to said tie rods intermediate the ends of the latter, the connections between two diagonally disposed axle boxes with the axles being made thru resilient sleeves to permit limited articulation, the other connections between axle boxes and axles being rigidly made.

7. A wheel mounted vehicle comprising, a pair of spaced axles, axle boxes carried adjacent the ends of said axles, a pair of longitudinal tie rods secured at their ends, respectively, to said axle boxes, and frame sides pivotally secured to said tie rods intermediate the ends of the latter, the connections between two diagonally disposed axle boxes with the axles being made thru resilient sleeves to permit limited articulation, the other connections between axle boxes and axles being rigidly made, said tie rods having limited articulation with said axle boxes at all points of connection therewith.

8. A wheel mounted vehicle comprising, a pair of spaced axles, axle boxes carried adjacent the ends of said axles, a pair of longitudinal tie rods secured at their ends, respectively, to said axle boxes, a pair of stirrups, and frame sides pivotally secured to said tie rods intermediate the ends of the latter, thru said stirrups, said stirrups secured to the frame sides by pivots articulated about transverse axes, the connections between two diagonally disposed axle boxes with the axles being made thru resilient sleeves to permit limited articulation, the other connections between axle boxes and axles being rigidly made, said tie rods having limited articulation with said axle boxes at all points of connection therewith.

AUGUST BENZ.